(12) United States Patent
Lee

(10) Patent No.: US 10,794,612 B2
(45) Date of Patent: Oct. 6, 2020

(54) HEAT SOURCE INTEGRATED AIR CONDITIONER

(71) Applicant: MOONMYUNG ACE CO., LTD, Daegu (KR)

(72) Inventor: Jun Beom Lee, Daegu (KR)

(73) Assignee: MOONMYUNG ACE CO., LTD, Daegu (KR)

( * ) Notice: Subject to any disclaimer, the term of this patent is extended or adjusted under 35 U.S.C. 154(b) by 153 days.

(21) Appl. No.: 15/960,598

(22) Filed: Apr. 24, 2018

(65) Prior Publication Data

US 2018/0313574 A1 Nov. 1, 2018

(30) Foreign Application Priority Data

Apr. 26, 2017 (KR) ........................ 10-2017-0053979

(51) Int. Cl.
*F24F 13/32* (2006.01)
*F24F 1/38* (2011.01)
*F24F 3/16* (2006.01)
*F24F 13/30* (2006.01)
*F24F 13/10* (2006.01)
*F24F 11/84* (2018.01)
*F24F 12/00* (2006.01)

(52) U.S. Cl.
CPC ................ *F24F 13/32* (2013.01); *F24F 1/38* (2013.01); *F24F 3/1603* (2013.01); *F24F 11/84* (2018.01); *F24F 12/003* (2013.01); *F24F 13/10* (2013.01); *F24F 13/30* (2013.01); *F24F 2221/16* (2013.01); *F24F 2221/34* (2013.01); *F24F 2221/54* (2013.01)

(58) Field of Classification Search
CPC .......... F24F 13/32; F24F 12/003; F24F 11/84; F24F 13/10; F24F 13/30; F24F 3/1603; F24F 1/38; F24F 2221/34; F24F 2221/16; F24F 2221/54; F24F 12/006; F24F 5/0003; F24F 3/06; F24F 13/04; F24F 12/001; F24F 12/002; F24F 2012/008
See application file for complete search history.

(56) References Cited

U.S. PATENT DOCUMENTS 7,114,553 B2 * 10/2006 Edwards ................. F24F 3/044
165/201
10,465,935 B2 * 11/2019 Tamaki ................... F25B 13/00
2012/0131933 A1 * 5/2012 Kim ....................... F24F 3/0442
62/89

* cited by examiner

*Primary Examiner* — David J Teitelbaum
*Assistant Examiner* — Heather J Huddle
(74) *Attorney, Agent, or Firm* — Lucas & Mercanti, LLP

(57) ABSTRACT

A heat source integrated air conditioner, which includes a freezer, a cooling tower, and a device for heating and is integrated up to heat source supply equipment to be capable of supplying cooling and heating as well as dehumidification, humidification, and ventilation is provided. The heat source integrated air conditioner is formed on an upper side of one frame and installed outside or on a rooftop of a building, thereby reducing time and cost for manufacturing, installation and maintenance, increasing utilization of a space inside a building, reducing heat loss and appliance costs by minimizing piping distance, and creating a pleasant indoor environment, and also enhancing utilization of a space inside the building and maximizing energy saving during operation of cooling/heating.

2 Claims, 5 Drawing Sheets

HEAT SOURCE INTEGRATED AIR CONDITIONER

CROSS-REFERENCE TO RELATED APPLICATIONS

This application claims the benefit of Korean Patent Application No. 10-2017-0053979, filed Apr. 26, 2017, the contents of which are incorporated by reference herein.

TECHNICAL FIELD

The present invention relates to a heat source integrated air conditioner. More particularly, a conventional air conditioner is dispersed as a whole in such a manner that a freezer, a cold water pump, a cooling water pump, a boiler, and the like, which are general heat source devices, are installed underground or in a separate machine room, an air conditioner for supplying air conditioning and ventilation to a room is installed underground or on each floor, and a cooling tower is installed on a rooftop or outside, but the invention relates to a heat source integrated air conditioner, which includes a freezer, a cooling tower, and a device for heating and is integrated up to heat source supply equipment, so that a heat source integrated air conditioner capable of supplying cooling and heating as well as dehumidification, humidification, and ventilation is formed at an upper side of one frame and can be installed outside or on a rooftop of a building, thereby reducing time and cost for manufacturing, installation and maintenance, increasing utilization of a space inside the building and, reducing heat loss and appliance cost by minimizing a piping distance, creating a pleasant indoor environment, enhancing utilization of an inner space, and maximizing energy reduction during an operation of cooling and heating.

DISCUSSION OF RELATED ART

Generally, an air handling unit (AHU, air conditioner), which is installed for the purpose of cooling and heating, is a device for purifying, cooling, dehumidifying, heating and humidifying air in each industrial field, computer room, business office, etc. The air conditioners that have been recently used are used for both heating and cooling, which are equipped with functions such that, by installing a blower, cold water of a freezer is transferred to a coil during cooling in the summer and steam or hot water from a boiler is transferred during heating in the winter, and cooling and heating is supplied to each room by the method of making cold or warm wind by applying a gas-direct-fired method.

The air conditioner used in the related art uses a method such that an appliance such as a freezer, a cold water pump, a cooling water pump, and a cooling tower configured to provide a heat source is connected to an inlet and outlet pipe so as to supply cooling and heating to a room, and thus it is inconvenient for a user due to installing the heat source separately from the appliance.

In addition, a general installation method is such that the freezer, the cold water pump, and the cooling water pump are installed in an underground machine room, the air conditioner is installed separately in a machine room or each floor, and the cooling tower is installed on a rooftop floor.

According to such an installation method, it is inconvenient for a manager during inspection, maintenance, or repair, and an occupancy space inside a building is also required due to the above-described appliances, which lowers utilization of the building space.

In addition, the construction cost is spent depending on a piping distance between the appliances, the heating, or the like as necessary, and energy loss is caused due to a distance interval, and loss of time and manpower is also caused in terms of management.

PRIOR ART DOCUMENT

Patent Document (Patent Document 1) KR 10-0556809 B1
(Patent Document 2) KR 10-2000-0058664 A
(Patent Document 3) KR 10-1633793 B1

SUMMARY OF DISCLOSURE

Technical Problem

To solve the above-described problem, the present invention is directed to providing a heat source integrated air conditioner, and an air conditioner in which a heat source required for air conditioning such as cooling/heating, ventilation, dehumidification, humidification, and the like is installed on one frame unit so that loss of energy due to separation distance between appliances may be prevented and convenience of maintenance, cost reduction, and efficient utilization of a building space may be enhanced.

Technical Solution

The present invention provides a heat source integrated air conditioner, including: a cooling tower (11) and a freezer (22) disposed outside the inner portion of the main body (10) and connected to each other by a pipe; a heat exchanger (14) disposed inside the inner portion of the body (10) and connected to the freezer 22 by a pipe; a gas burner (32) formed at one side of the inside of the inner portion of the main body (10); an exhaust damper (23) and an outside air damper (25) formed at the other side of the inside of the inner portion of the main body (10); an exhaust damper (24) and an outside air damper (26) formed on the outside of the inner portion of the main body (10); a control unit (40) disposed outside the inner portion of the main body (10); an air supply fan (17) disposed between the gas burner (32) and the heat exchanger (14); and a ventilation fan (13) formed at an end portion of the other side of the inside of the inner portion of the main body (10), wherein cooling water pumps (20, 21, 27 and 28) are formed at the pipes between the cooling tower (11) and the freezer (22), and between the freezer (22) and the heat exchanger (14), and wherein a flow rate control valve is installed between the freezer (22) and the heat exchanger, the control unit (40) is formed to control the flow rate control valve, the heat exchanger (14) is disposed between the gas burner (32), the exhaust damper (23), and the outside air damper (25), a filter (15) is formed between the heat exchanger (14), and the exhaust damper (23) and the outside air damper (25) disposed inside the inner portion of the main body (10), and a total heat exchanger (29) is formed between the exhaust dampers (23 and 24) and the outside air dampers (25 and 26).

In addition, an air supply chamber (18) and a ventilation chamber (12) may be formed at one end portion and the other end portion of the inside of the inner portion of the main body (10), respectively, so that air, which is introduced into the ventilation chamber (12), flows and is discharged into the air supply chamber (18).

Advantageous Effects

According to a heat source integrated air conditioner of the present invention, since it is possible to integrally configure cooling and heating as well as dehumidification and ventilation in one appliance, time and cost involved in manufacturing, installation and maintenance can be reduced and a pleasant environment can be conveniently created.

In addition, the present invention can reduce the energy loss by shortening a piping distance between appliances, and an integrated equipment and appliance can be installed on a rooftop or outdoor in an idle space, thereby maximizing utilization of the space in the building.

DETAILED DESCRIPTION OF EXEMPLARY EMBODIMENTS

Figure 1:
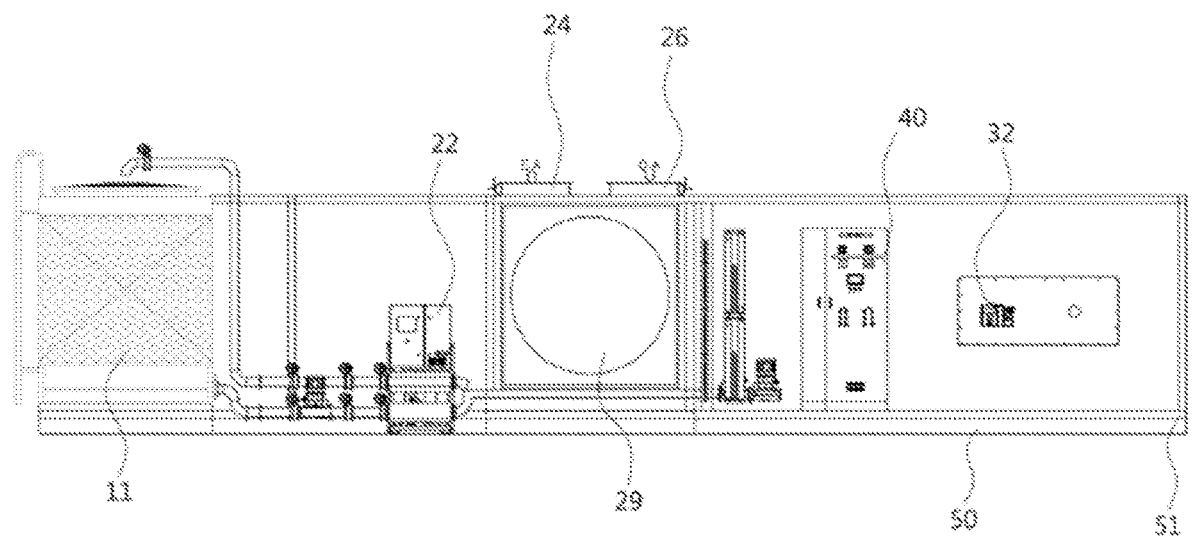
FIG. 1 is a front view of a state in which a main part of the present invention is assembled.

Hereinafter, exemplary embodiments of the present invention that are easily performed by those skilled in the art will be described in detail with reference to the accompanying drawings. However, the present invention may be implemented in various different forms and is not limited to the embodiments described herein.

Further, elements which do not relate to the detail description are not shown in the drawings to clearly describe the present invention, and similar elements in the following description are designated by similar reference numerals.

Throughout the specification, when a part is referred to as including an element, it means that the part may include other elements as well without controlling the other elements unless specifically stated otherwise.

First, an air conditioner main body 10 of the present invention may include a freezer 22, a heat exchanger 14, an air supply fan 17, a ventilation fan 13, and the like so that cooling or heating may be performed.

Here, on the upper side of a frame 50 and a support plate 51, an inner portion of the air conditioner main body 10, which is divided into an inside and an outside is integrally formed.

In addition, a cooling tower 11, the freezer 22 and a control unit 40 may be formed outside the inner portion of the air conditioner main body 10, a ventilation fan 13, the heat exchanger 14, a filter 15, the air supply fan 17, and a gas burner 32 may be formed inside the inner portion thereof, and exhaust dampers 23 and 24, outside air dampers 25 and 26, and a mixing damper 19 configured to circulate the air generated by the air supply fan 17 and the ventilation fan 13 may be formed together so that cooling or heating may be performed.

Accordingly, since the components disposed outside the inner portion of the main body 10 are formed so that heat from the gas burner 32 or heated steam is not transferred, safety and efficiency of the apparatus may be further increased. In addition, since the heat exchanger 14 is disposed outside the inner portion of the main body while being connected to the freezer 22 outside the inner portion of the main body, the heat exchanger 14 may be formed to cool down the air.

Since the exhaust dampers 23 and 24 and the outside air dampers 25 and 26 are formed both inside and outside of the inner portion of the main body 10 so as to provide a base capable of controlling the outside air to be introduced into the main body 10, it is possible for a user to cool down the equipment disposed outside, and also to collect heat discharged from a room to an outside through a total heat exchanger 29.

Further, the air inside the inner portion of the main body 10 may be introduced from the ventilation chamber 12 of an end portion of the other side and may be introduced and discharged to the air supply chamber 18, which is an end portion of one side. At this point, the exhaust damper 23, the outside air damper 25, the filter 15, the heat exchanger 14, and the gas burner 32 are sequentially disposed at a position in which the air flows.

Accordingly, the air introduced into the room may receive hot or cold air collected from the total heat exchanger 29, pass through the filter 15 so as to cool down the heat exchanger 14 in a state in which dust or the like is filtered, or be introduced into the room through the heating of the gas burner 32. Therefore, since it is possible to provide an air conditioner capable of efficiently operating even in a large-scale industrial site, such as a factory, by the disposition between the above-described configurations, not only can more industrial workers be satisfied but health of the workers can also be improved.

Meanwhile, the freezer 22 may compress a low-temperature and low-pressure gas phase refrigerant suctioned through a suction inlet as in a general refrigeration cycle, and function to change a state of the gas to become high temperature and high pressure, and the cooling may be performed by connecting the an inlet pipe and an outlet pipe of the freezer 22 to the heat exchanger 14.

Also, the heat exchanger 14 may be installed inside the inner portion of the air conditioner main body, and the heat exchanger 14 may perform a cooling action by the cold water, and the heating is performed by the indirect gas burner 32.

In addition, the air supply fan 17 may promote the heat exchange action of the heat exchanger 14 and simultaneously, perform a function of generating cold air or hot air required in a room.

In addition to this, the heat exchanger 14 may perform heat exchange with the surrounding air, and the air supply fan 17 may perform a function of promoting the heat exchange of the heat exchanger 14 like the ventilation fan 13.

Here, the heat exchanger 14 may be configured to which a fin-tube heat exchanger is applied such that a pipe, which is usually made of a copper pipe material in a snack form and is provided to flow cold water therein, is fixed and supported at a predetermined interval by a plurality of cooling fins made of an aluminum material.

Furthermore, the mixing damper 19 communicating with one end of each of the exhaust dampers 23 and 24 and the outside air dampers 25 and 26 may be formed at one side and the other side of a central portion thereof.

The outside air dampers 25 and 26 may function as a flow path for transferring outdoor air or indoor air, and the exhaust dampers 23 and 24 may function as a path through which the air exits to the outside and is discharged to indoors or outdoors.

Meanwhile, the cooling water cooled in the cooling tower 11 may be pressurized by pumps 27 and 28 and connected to the freezer through the supply path, the above-described flow rate control valve (not shown) may be installed on the supply path of the freezer 22 and the heat exchanger 14, and an amount of cold water introduced into the heat exchanger 14 may be linearly and continuously controlled.

As described above, by controlling a supply amount of the cold water by the flow rate control valve, an amount of the cold water supplied to the heat exchanger may be controlled depending on an operating state of the air conditioner.

In addition, the control unit 40 may collect the operating state of the heat source integrated air conditioner of the present invention to control an overall air conditioning system of a building.

For example, when the heat source integrated air conditioner of the present invention is fully operated, an operation state of the cooling tower 11 may be controlled to be fully operated.

Further, the control unit 40 may control the flow rate control valve depending on an operation state of the heat exchanger 14.

For example, when a cooling load of the heat exchanger 14 is high and thus the freezer 22 is operated more, an opening degree of the flow rate control valve may be increased so that more cold water may be introduced into the heat exchanger 14, and when a cooling load is small and the freezer 22 is operated less, an opening degree may be decreased so that a lesser amount of cold water may be integrally controlled and introduced.

Furthermore, the gas burner 32 may perform a function of heating.

As a result, the air conditioner main body 10 may be integrally formed on the upper side of the frame 50 and the support plate 51.

In addition, the freezer 22, the heat exchanger 14, the air supply fan 17, and the ventilation fan 13 may be formed together, and the exhaust dampers 23 and 24, the outer air dampers 25 and 26, and the total heat exchanger 29 configured to circulate air generated in the above-described air supply fan 17 and the ventilation fan 13 may be formed together in the air conditioner main body 10, so that cooling due to cold water and heating due to a gas burner may be performed.

Here, when the outside air is introduced through the total heat exchanger 29, the total heat (sensible heat+latent heat) of the inside air may be transferred to the outside air by rotation of a rotor, so that the total heat exchanger 29 may function to collect waste heat of the wasted air. An operation of the present invention having such a configuration will be described with reference to the drawings.

FIG. 1 is a front view of a state in which a main part of the present invention is assembled.

The total heat exchanger 29 may be formed at a center of the air conditioner main body 10 having an inner portion divided into an inside and an outside, and the exhaust damper 24 and the outside air damper 26 are formed at the upper side of the total heat exchanger 29.

Further, the cooling tower 11 and the freezer 22 may be disposed outside the inner portion of the main body 10 and connected to each other by a pipe. Furthermore, the heat exchanger 14 for cooling disposed inside an inner portion of the main body 10 and connected to the freezer 22 by a pipe and the gas burner 32 for heating disposed inside the inner portion of the main body 10 may be formed, and the control unit 40 disposed outside the inner portion of the main body 10 may be interlocked to optimize conditions of all the parts.

Figure 2:
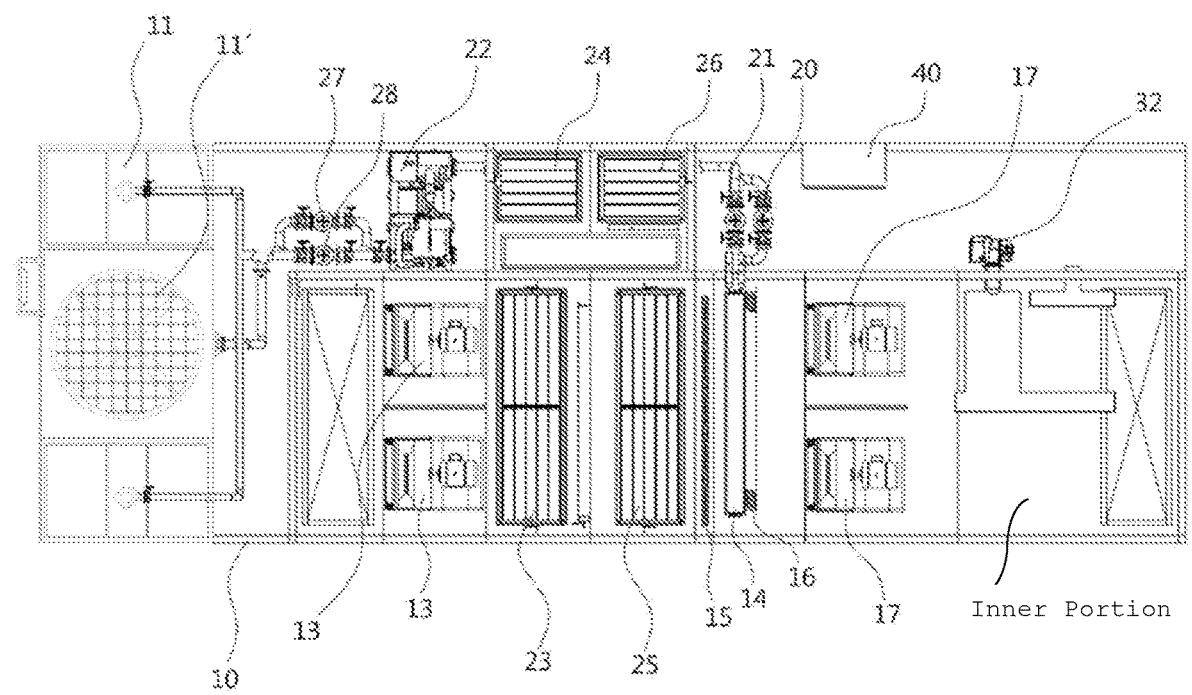
FIG. 2 is a plan view of a state in which a main part of the present invention is assembled.

FIG. 2 is a plan view of a state in which a main part of the present invention is assembled.

Here, the exhaust dampers 23 and 24 and the outside air dampers 25 and 26 may be formed at a center of the upper portion of the air conditioner main body 10 and the cold water pumps 20 and 21 and the gas burner 32 connected to the heat exchanger 14 may be formed at one side thereof.

The ventilation fan 13, the air supply fan 17, the cooling water pumps 27 and 28, the freezer 22, and the cooling tower 11 may be integrally formed.

In addition, the control unit 40 for controlling the system of the present invention may be integrally configured.

Figure 3:
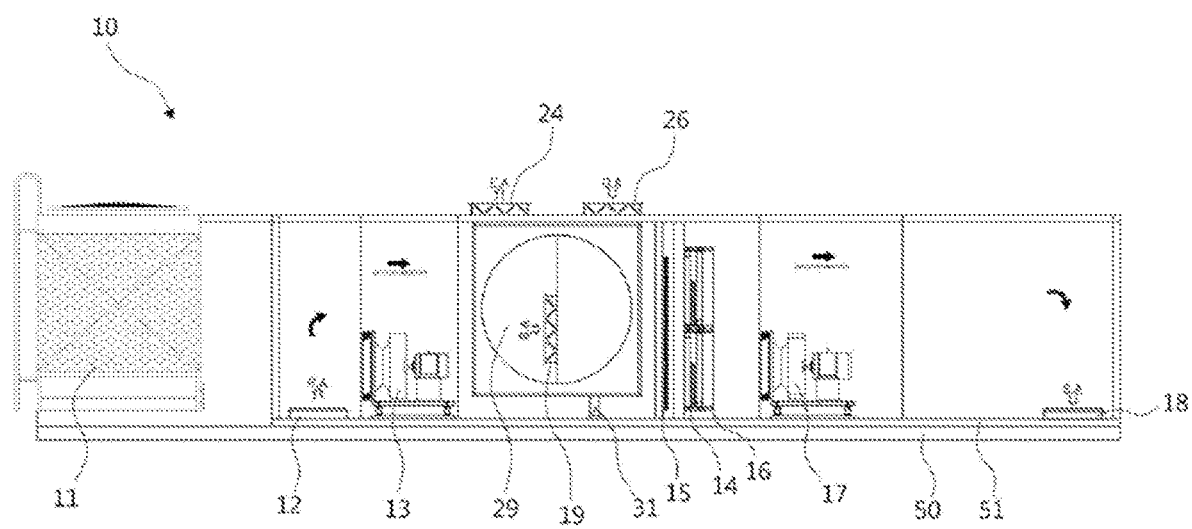
FIG. 3 is a rear view of a state in which a main part of the present invention is assembled.

FIG. 3 is a rear view of a state in which a main part of the present invention is assembled.

Here, FIG. 3 is a rear view of the air conditioner main body 10. The exhaust damper 23, the outside air damper 25, the ventilation fan 13, and the air supply fan 17 may be disposed on the left and right sides of the mixing damper 19.

Further, the ventilation chamber 12 and the air supply chamber 18 may be formed at one end portion and the other end portion of the inside of the inner portion of the main body 10, respectively, so that air may be introduced into the ventilation chamber 12 and flow into the air supply chamber 18, and may be connected to the ventilation fan 13 and the air supply fan 17.

Furthermore, the filter 15 may be formed between the heat exchanger 14, and the exhaust damper 23 and the outside air damper 25 disposed inside the main body 10, and in addition, an eliminator 16 may be additionally formed and interlocked with the heat exchanger 14.

Figure 4:
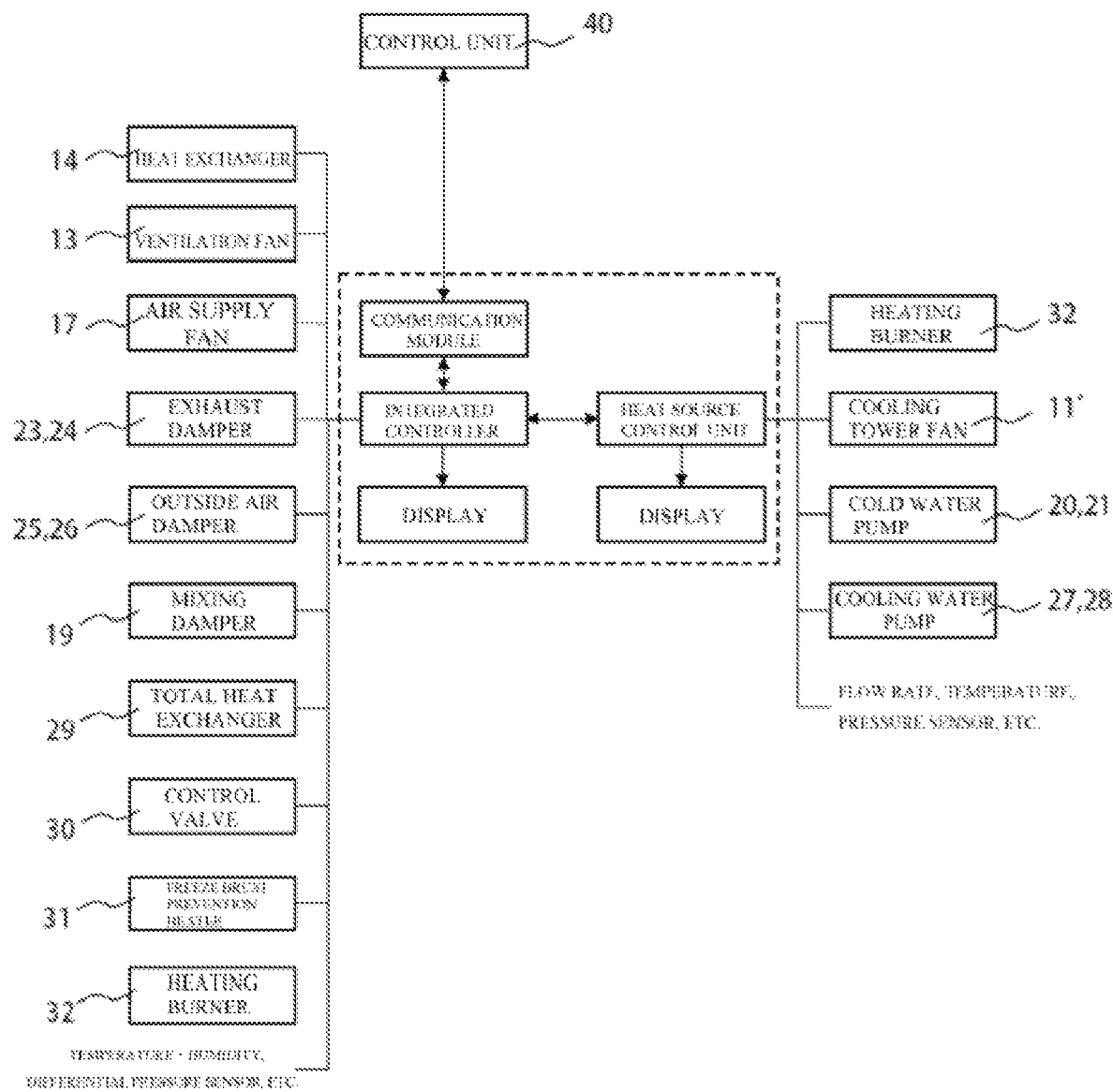
FIG. 4 is a work process diagram schematically illustrating an operation state of a control unit which is a main part of the present invention.

FIG. 4 is a work process diagram schematically illustrating an operation state of the control unit which is a main part of the present invention.

Here, the control unit 40 may be displayed after being integrally controlled via a communication module.

Here, the control unit 40 may automatically control the gas burner 32, the cooling tower fan 11', the cold water pumps 20 and 21, the cooling water pumps 27 and 28, and the freezer 22 via the heat source control unit.

In addition, the heat source control unit may automatically control the heat exchanger 14, the ventilation fan 13, the air supply fan 17, the exhaust dampers 23 and 24, the outside air dampers 25 and 26, the mixing damper 19, the total heat exchanger 29, a control valve 30, a freeze-burst prevention heater 31, and the gas burner 31 via an integrated controller of the control unit 40.

Figure 5:
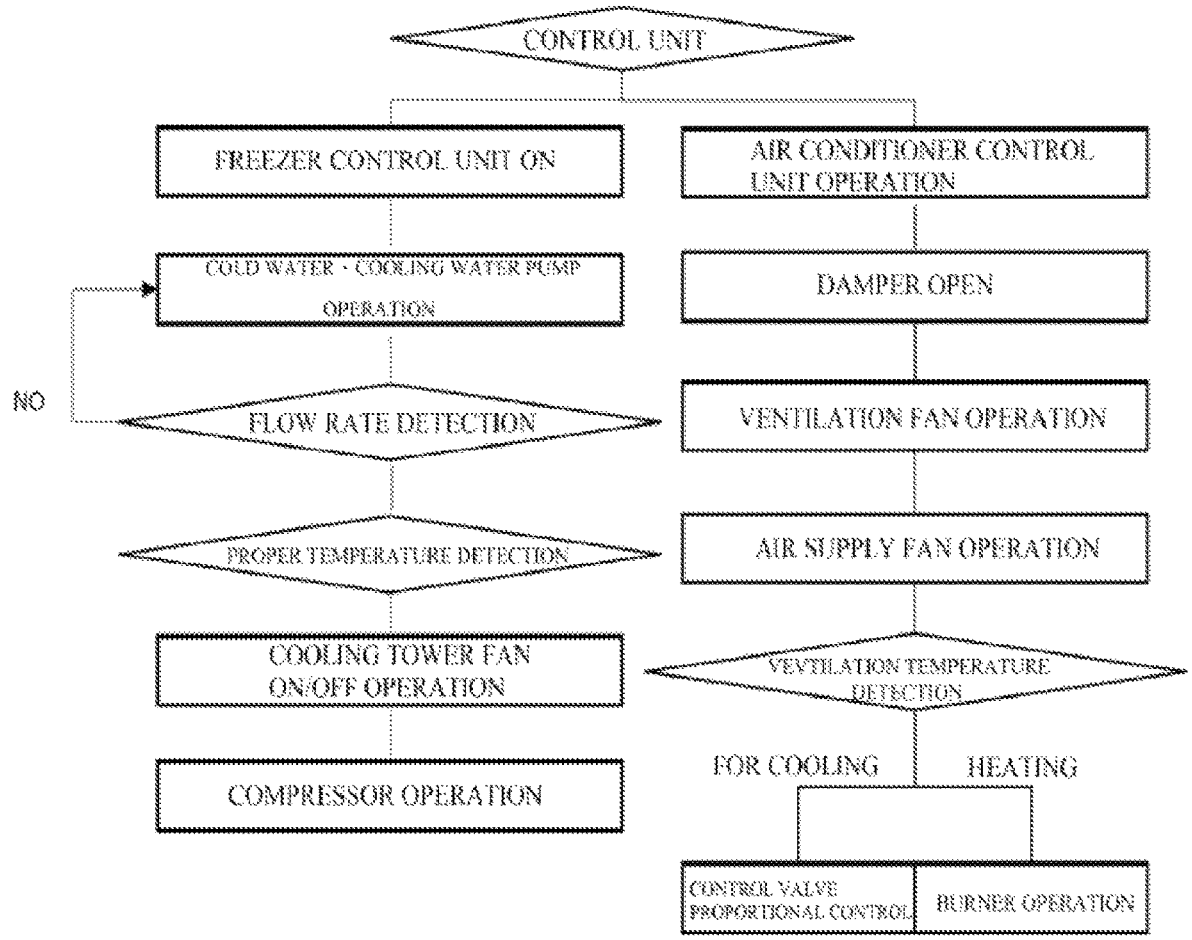
FIG. 5 is a process flow chart illustrating an operating state of a movable assembly-type air conditioning system of the present invention.

FIG. 5 is a process flow chart illustrating an operating state of a heat source integrated air conditioner of the present invention.

Here, the cold water and cooling water pumps 20, 21, 27, and 28 may be operated when the freezer 22 connected to the control unit 40 is switched to the ON position.

Here, a temperature of the flow rate supplied from the cold water and cooling water pumps 20, 21, 27 and 28 may be detected so as to operate a cooling tower fan 11' formed at the cooling tower 11 and to drive the freezer 22 together.

Here, the freezer 22 may be operated at the same time as the air conditioner and the outside air dampers 25 and 26 may be opened.

At the same time, the ventilation fan 13 and the air supply fan 17 may be operated. At this point, after the temperature of the air which is ventilated is detected, the control valve may be operated during cooling and the burner may be operated during heating.

That is, the air conditioner main body 10 may be integrally formed at an upper side of the frame 50 and the support plate 51, and the freezer 22, the heat exchanger 14, the air supply fan 17, the ventilation fan 13 may be formed at an upper portion of the main body 10, and, the exhaust dampers 23 and 24, the outside air dampers 25 and 26, and mixing damper 19 configured to circulate the air generated in the air supply fan 17 and the ventilation fan 13 may be formed together to perform cooling and heating.

As described above, according to the present invention, an integrated control unit configured to control the various pumps of the freezer and the cooling tower is formed, so that cooling and heating, as well as dehumidification and ventilation may be implemented in a single device, and thus not only is it possible to conveniently create a pleasant environment but time and cost of manufacturing, installation and maintenance may also be reduced In addition, the present invention may not only dry a stored article or make an indoor pleasant environment through dehumidification using the indoor air, but the dehumidification may also be smoothly achieved despite low relative humidity due to a supply of an outside air and a discharge of an inside air through the exhaust damper and the outside air damper, and thus it is possible to make a desired state of a room.

Further, waste heat via the total heat exchanger may be collected, and thus energy is reduced.

The foregoing description of the present invention is intended to be illustrative, and it will be understood by those of ordinary skill in the art that various changes in form and details may be made therein without departing from the spirit and scope of the present invention as defined by the appended claims and their equivalents. Therefore, it is to be understood that the above-described embodiments are exemplary in all aspects rather than limiting.

For example, each component described as a single entity may be distributed and implemented, and components described as being distributed may also be implemented in a combined form.

The scope of the present invention is not to be limited by the detailed description, but is defined by the scope of the following claims. The meaning and scope of the claims, and all changes or modifications derived from the equivalents thereof, are to be interpreted as being included in the scope of the present invention.

DESCRIPTION OF REFERENCE NUMERALS

| | |
|---|---|
| 10: air conditioner main body | 11: cooling tower |
| 11': cooling tower fan | 12: ventilation chamber |
| 13: ventilation fan | 14: heat exchanger |
| 15: filter | 16: eliminator |
| 17: air supply fan | 18: air supply chamber |
| 19: mixing damper | 22: freezer |
| 20, 21: cold water pump | 24: exhaust damper |
| 23: exhaust damper | 26: outside air damper |
| 25: outside air damper | 29: total heat exchanger |
| 27, 28: cooling water pump | 32: gas burner |
| 30: control value | 50: frame |
| 31: freeze-burst prevention heater | |
| 40: control unit | |
| 51: support plate | |

The invention claimed is:

1. A heat source integrated air conditioner, comprising:
a main body having an inner portion divided into an inside and an outside;
a cooling tower and a compressor disposed outside the inner portion of the main body and connected to each other by a first pipe;
a heat exchanger disposed inside the inner portion of the body and connected to the compressor by a second pipe;
a gas burner formed at one side of the inside of the inner portion of the main body;
a first exhaust damper and a first outside air damper formed at an other side of the inside of the inner portion of the main body;
a second exhaust damper and a second outside air damper formed on the outside of the inner portion of the main body;
a control unit disposed outside the inner portion of the main body;
an air supply fan disposed between the gas burner and the heat exchanger;
a ventilation fan formed at an end portion of the other side of the inside of the inner portion of the main body;
wherein cooling water pumps are formed at the first pipe between the cooling tower and the compressor, and at the second pipe between the compressor and the heat exchanger; and
wherein
a flow rate control valve is installed between the compressor and the heat exchanger,
the control unit is formed to control the flow rate control valve,
the heat exchanger is disposed between the gas burner, the exhaust damper, and the outside air damper,
a filter is formed between the heat exchanger, and the exhaust damper and the outside air damper disposed inside the inner portion of the main body, and
a total heat exchanger is formed between the exhaust dampers and the outside air dampers.

2. The heat source integrated air conditioner of claim 1, wherein an air supply chamber and a ventilation chamber are formed at one end portion and the other end portion of the inside of the inner portion of the main body, respectively, so that air, which is introduced into the ventilation chamber, flows and is discharged into the air supply chamber.

* * * * *